Aug. 2, 1927.

G. ISAGO 1,637,644

BEET TOPPING MACHINE

Filed July 1, 1926    2 Sheets-Sheet 1

INVENTOR
Gensuke Isago
BY
White Frost
his ATTORNEYS

Aug. 2, 1927.

G. ISAGO

BEET TOPPING MACHINE

Filed July 1, 1926   2 Sheets-Sheet 2

INVENTOR
Gensuke Isago
BY White Frost
his ATTORNEYS

Patented Aug. 2, 1927.

1,637,644

UNITED STATES PATENT OFFICE.

GENSUKE ISAGO, OF ELY, NEVADA.

BEET-TOPPING MACHINE.

Application filed July 1, 1926. Serial No. 119,864.

This invention relates generally to agricultural machinery for cutting vegetation and particularly to a machine for topping beets.

In the past, such machines have been impractical for many reasons. The knives or other cutting devices did not properly function at all times as no adequate provision was made for their adjustment relative to the ground and therefore uniform cutting was impossible. Furthermore, the machines did not properly position the tops of the beets prior to cutting so that a large portion of the tops were not affected. These difficulties and others have been obviated by certain novel features incorporated in my machine.

It is therefore an object of this invention to devise a beet topping machine in which the position of the knives is automatically controlled.

It is a further object of this invention to devise a beet topping machine in which the beet tops are alined parallel to the line of travel of the machine prior to the cutting operation.

It is a further object of this invention to devise a novel form of counterweight mechanism for counter-balancing the knife supporting hanger in which the balancing effect is varied in accordance with the height of the beets.

Further objects of the invention will appear from the following description in which I have set forth the preferred embodiment of my invention. It is to be understood that the invention is only to be limited by the terms of the appended claims and the state of the prior art.

Referring to the drawings:

Fig. 4 is a plan detail of the counterbalance lever.

Figure 1:
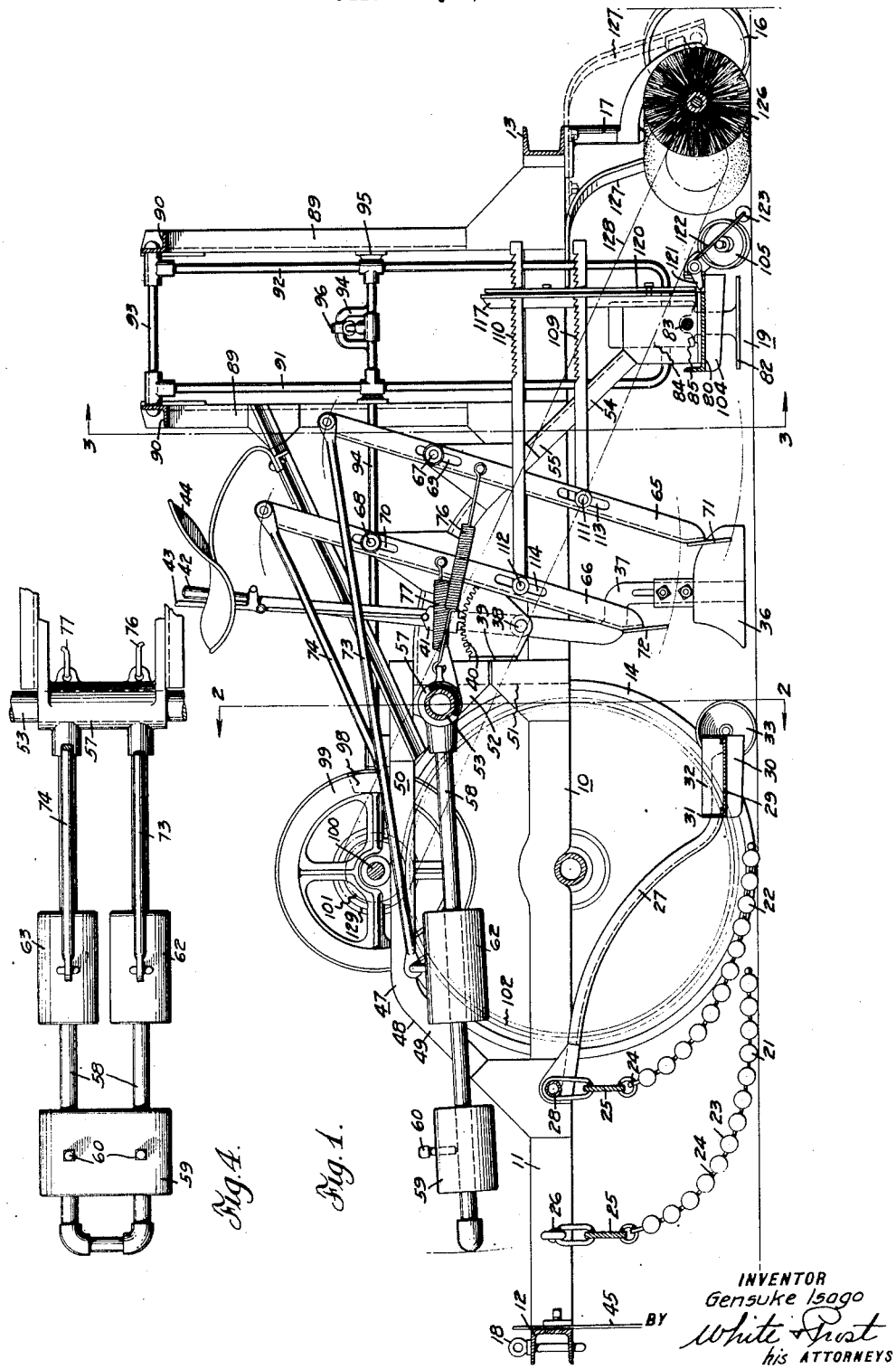
Figure 1 is a longitudinal cross sectional view of the complete machine.

The device comprises generally a wheeled vehicle carrying cutting knives which are adapted to operate upon the tops of beets or other vegetation. These knives are mounted upon a hanger and means is provided whereby the position of the hanger with respect to the ground is automatically controlled so that the knives will function efficiently at all times. The machine also carries a device which serves to straighten out the beet tops in alinement with the general direction of movement of the vehicle whereby all of the tops are brought into position to be cut by the knives.

Referring to the drawings, the vehicle shown comprises generally a frame 10 constructed of spaced longitudinal beams 11 joined at their ends by transverse beams 12 and 13. The frame is supported by suitable wheels 14 which are spaced sufficiently far apart to straddle a row of beets. The rear end of the frame may be supported by suitable caster wheels 16 mounted upon brackets 17 which are secured to the beams 11. Although it is obvious that the machine may be in the form of a motor tractor, it has been shown as provided with a front clevis 18 by means of which attachment may be made to either a whiffletree or a tractor. The cutting mechanism is designated generally at 19 and is supported adjacent the ground in a position centrally of the frame.

Positioned in front of the cutting mechanism means is provided for preparing the tops of the beets so that they may be more effectively cut by the knives. Thus as in Fig. 1, there is shown a pair of flexible drags 21 and 22 for beating down the tops of the beets. Each of these drags may comprise a flexible mat made up of a plurality of weights 23 held together by cables 24, the upper edge of the mat being secured to a cross beam 25. The ends of the cross beam 25 may be pivotally connected as at 26 to the longitudinal frame members 11. Behind the drag 22 means has been provided for straightening out and alining the tops of the beets in the general direction of the path of movement of the vehicle. This means preferably comprises a hanger 27 which is provided with a suitable pivotal connection 28 to the frame of the vehicle and is provided at its lower end with a transverse horizontal plate 29. Mounted upon the lower side of the plate 29 are a plurality of spaced parallel knives 30 which when drawn through the tops of the beets, tend to comb out and aline them parallel to the general direction of movement of the vehicle. In order to press the knives 30 into the tops of the beets the upper side of plate 29 may be provided with flanges 31 thereby forming a container 32 in which weights may be placed. The hanger 27 may also be provided adjacent its lower end with a pair of wheels 33 in order to normally support the knives 30 out of contact with the ground.

Between the knives 30 and the cutting mechanism 19 plow devices are provided for forming a furrow upon either side of a row of beets. Each of these plowing devices comprises a plow share 36 which is adjustably mounted upon a bar 37, the bar 37 being pivotally mounted as at 38 to a bracket 39 which is mounted upon the frame of the vehicle. The angular position of the bar 37 may be adjusted by means of the toothed segments 40 which cooperate with a pawl 41 carried by the bar 37. The upper portion of the bar is extended to form a handle 42 which is provided with a pawl control lever 43 whereby an operator may set the bar 37 to any desired angular position thereby raising or lowering the plow share 36. The handle 42 for the two plows preferably terminates adjacent an operator's seat 44 which is suitably mounted upon the vehicle frame. As an additional means for beating down the tops of the beets, the front of the machine may be provided with a plurality of resilient fingers 45 extending transversely across the machine so as to engage the tops of the beets. These fingers are preferably mounted upon the transverse beam 12 in such a manner as to be vertically adjustable.

Figure 2:
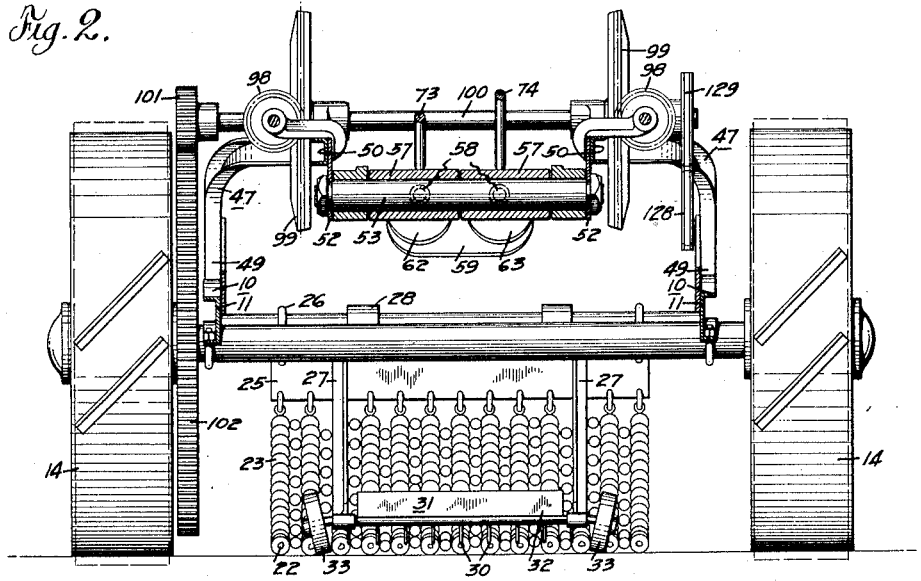
Fig. 2 is a cross sectional view taken along the line 2—2 of Fig. 1.
Figure 3:
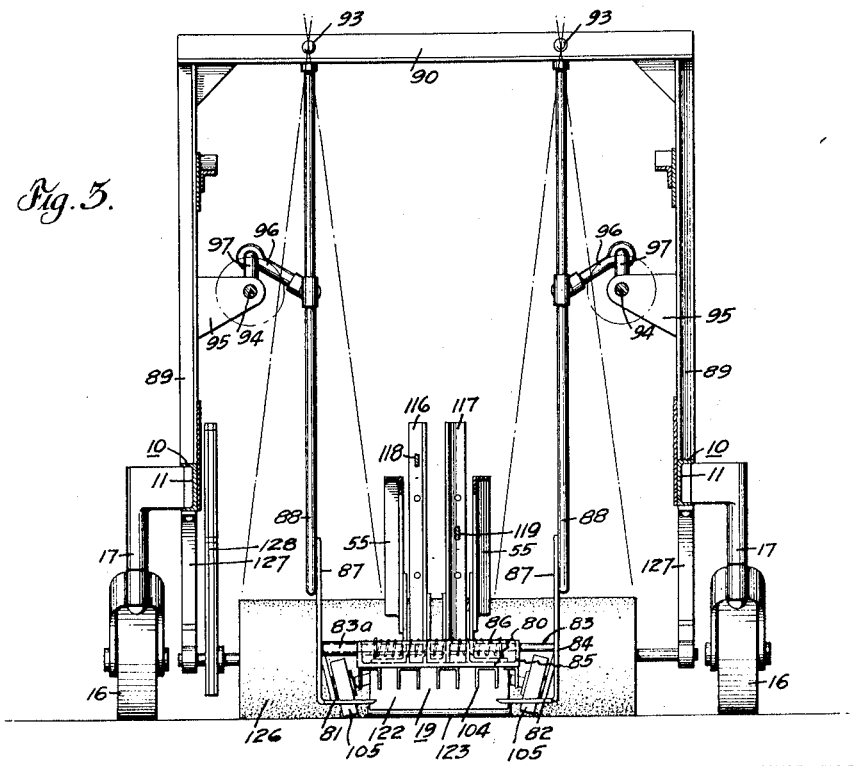
Fig. 3 is a transverse cross sectional view taken along the line 3—3 of Fig. 1.

The mounting and automatic control for the cutting mechanism will now be described. Above the vehicle frame there is mounted what may be termed a hanger support frame 47 which includes a pair of angle members 48 secured to the longitudinal beam 11. Each of the angle members 48 includes a forwardly inclined portion 49 which is secured to the corresponding beam 11 and a horizontal portion 50 which is curved towards the center of the machine as shown in Fig. 2. The rear ends of the angle members 48 are shown as being supported and retained in spaced relationship by means of angle members 51 which are shown in dotted lines in Fig. 1, the upper ends of the angle members 51 being secured to the rear ends of the angle members 48, while the lower ends are suitably mounted upon the longitudinal beam 11. A gusset plate 52 may be employed for connecting the angle members 48 and 51. Mounted upon the hanger support frame there is a rod or rods 53 which preferably has its ends secured to the plate 52. The tube 53 serves as a pivotal support for the hanger 54 upon which the knives are mounted.

The hanger 54 is constructed of spaced parallel angle members 55 which are preferably curved downwardly so as to extend below and to the rear of the rod 53. The upper ends of these angle members are secured to journal members 57 which are mounted upon the rod 53. Also secured to the journal members 57 are a pair of counterweight levers 58 which are extended forwardly of the machine. Adjacent the outer end of the counterweight levers 58 there is secured an adjustable counterweight 59 which is preferably slidably mounted upon the levers 58, its position being fixed by tightening set screws 60. A pair of additional counterweights 62 and 63 are also slidably mounted upon the counterweight levers 58.

The positions of the counterweights 62 and 63 are automatically varied to change the counterbalancing effect upon the knife support hanger 54. In the particular construction shown there are provided control levers 65 and 66, the lever 65 having a pivotal connection 67 with the right hand angle member 55, and the lever 66 having a similar pivotal connection 68 with the left hand angle member 55. Slots 69 and 70 in the levers 65 and 66 permit the pivotal connections of these levers to be adjusted as desired. The lower ends of the control levers are provided with beet top engaging members or plates 71 and 72 which are normally disposed at different heights from the ground so that the plate 72 will only be engaged by beet tops which are unusually high. The upper ends of the control levers are operatively connected to the counterweights 62 and 63 by means of rods 73 and 74 whereby movement of the control levers causes a corresponding shifting in position of the counterweights 62 and 63. Tension springs 76 and 77 are connected respectively to the levers 65 and 66 in order to normally retain the levers in such a position that the counterweights 62 and 63 will be disposed relatively close to the pivot rod 53.

The cutting mechanism 19 which is mounted upon the hanger 54 may be of any well known construction. In the particular arrangement shown there is provided a plate 80 which is suitably mounted upon the lower end of the angle member 55. Operatively disposed below this plate are the knives 81 and 82 which are adapted to be reciprocated laterally in order to chop off the tops of the beets. The mounting for one of these knives, comprises rod 83 which is fixed to an upturned portion 84 of the knife, the rod 83 being slidably mounted in a flange 85 provided upon the plate 80, the other knife having a similarly mounted tube 83ª within which the rod 83 telescopes. Compression spring 86 serves to yieldingly retain the knives apart. The knives are also provided with vertical extensions 87 which are adapted to engage the oscillating actuating levers 88. In order to provide a support for the levers 88 vertical angle members 89 are extended upwardly from the frame of the vehicle and these angle members are connected at their upper ends by horizontal angle members 90. The levers 88 are preferably made U-shaped as shown in Fig. 1, the branches 91 and 92 of these levers being journalled to the cross bar 93 which is secured at its ends to the horizontal angle members 90. The levers 88 are adapted to be oscillated by means of crank shafts 94 which are journalled to the brackets 95, these brackets being preferably mounted upon the vertical angle members 89. A crank rod 96 serves to operatively connect the crank 97 of the crank shaft to the oscillating levers 88. The crank shafts are rotated in opposite directions by any suitable mechanism such as a pinion 98 associated with a gear 99 carried by the countershaft 100. Upon one end of the countershaft 100 there is also mounted a pinion 101 associated with a gear 102 carried by one of the wheels 14 of the vehicle, whereby the crank shaft will be rotated upon movement of the vehicle.

It will be noted that with the above actuating mechanism the oscillating levers 88 will simulaneously and oppositely actuate the knives 81 by means of abutting engagements between the lower ends of the levers 88 and the extensions 87. Therefore the knives may be adjusted vertically without affecting the actuating mechanism. Additional knives 104 may be mounted upon the lower side of the plate 80, these knives being arranged parallel to the travel of the machine and having a function similar to the knives 30 previously described; that is, they serve to straighten out the tops of the beets. In order to guide the cutting knives over the top of the row there may be provided a pair of rollers 105 mounted upon the sides of the plate 80 in such a manner as to engage the edges of the row.

In order to prevent too frequent variation of the counterbalance weights 62 and 63 the knife support hanger 54 is preferably provided with means for locking the control levers 65 and 66 in certain adjusted positions. Means has also been provided for releasing this locking means in case the knives should be lifted too far from the ground. Thus a pair of racks 109 and 110 are provided with pivotal connections 111 and 112 with the control levers 65 and 66 respectively. The pivotal connections 111 and 112 are preferably made adjustable in the slots 113 and 114 respectively as shown so that the degree of movement of the racks 109 and 110 may be varied for given angular movements of the control levers. Secured to the plate 80 and extending upwardly therefrom are angle members 116 and 117 which are provided with apertures 118 and 119 for slidably receiving the racks 110 and 109. A locking plate 120 is slidably mounted upon the angle members 116 and 117 and is similarly provided with elongated apertures to receive the racks 109 and 110. It will be obvious that movement of the locking plate 120 to its lowered position will cause the racks 109 and 110 to be engaged to prevent their movement toward the front of the machine while movement of the locking plate to its upper position will permit the springs 76 and 77 to return the control levers and the racks 109 and 110 to their most forward position. The locking plate 120 is operated by means of a finger 121 which is secured in fixed relationship to the plate 122, this plate being pivotally mounted at its upper edge to the plate 80. This door is preferably provided with a weight 123 whereby it normally takes a lowered position in which the finger 121 forces the locking plate to its upper position to receive the racks 109 and 110. This position of the plate 122 corresponds generally to a position in which the knives are raised clear of the ground.

The operation of the machine is as follows: Upon being drawn over a row of beets the resilient fingers 45 in conjunction with the drags 21 and 22 serve to beat down the tops of the beets so that they will lie in the general direction of the path of travel of the machine. The tops are then acted upon by knives 30 which tend to comb through the tops and align them with the path of travel of the machine. In case the plows 36 are employed a furrow is cut on either side of the row of beets, the extent of this furrow being controlled by the operator by manipulation of the hand levers 42. The tops of the beets will then engage either the plate 71 or both of the plates 71 and 72 depending upon their relative height. For example, if the beet tops are of only normal height, then the plate 71 will be only engaged to move the control lever 65 and accordingly shift the counterbalance weight 62 farther from the pivot rod 53, thus increasing the counterbalance effect upon the cutting knives. If the contour of the ground is rough or the tops of the beets are unusually tall then plate 72 will also be engaged to move the control lever 66 and accordingly shift the counterbalance weight 63 toward the outer end of the lever 58 to further increase the counterbalancing effect and thus cause the cutting knives to be lifted higher relative to the frame of the machine. These knives are reciprocated oppositely by rotation of the crank shaft 94, thus effectively cutting off the tops of the beets. While the cutting knives are operating effectively upon the tops of the beets the plate 122 will be elevated by engagement with the ground so that the locking plate 120 will engage the racks 109 and 110 to retain the control levers 65 and 66 in their adjusted position. However, in case the knives should be elevated too high then the plate 122 will swing downwardly to cause the finger 121 to lift the locking plate and thus release the control levers and permit the counterbalance weights 62 and 63 to swing inwardly and permit the knife support hanger to again swing downwardly to bring the knives in operative position upon the tops of the beets.

In some cases it may be desirable to provide means for removing the tops of the beets to one side of the row. Thus, there has been provided a rotary brush 126 which is carried by the brackets 127 which are attached to the vehicle frame, the brush being inclined to the path of movement of the machine so as to throw material to one side. This brush may be rotated by any suitable means such as a belt 128 which is operated from a pulley 129 mounted upon the countershaft 100.

I claim:

1. A machine of the class described comprising a vehicle, a pivoted hanger supported by said vehicle, knife means mounted upon said hanger, and means for counterbalancing said hanger comprising a weight having its effective leverage normally fixed, and another weight having its effective leverage automatically varied in accordance with the height of vegetation being cut by the machine.

2. A machine of the class described comprising a vehicle, a pivoted hanger supported by said vehicle, knife means mounted upon said hanger, and means for counter-balancing said hanger comprising a weight, and means for varying the effective leverage of said weight in accordance with the height of vegetation being cut.

3. A machine of the class described comprising a vehicle having a frame, a hanger pivotally mounted on said frame, knives supported on said hanger, a counterweight lever secured to said hanger, a counterweight slidably mounted on said lever, and means for automatically controlling the position of said counterweight in accordance with the character of vegetation being cut.

4. A machine of the class described comprising a vehicle having a frame, a hanger pivotally mounted on said frame, knives supported on said hanger, a counterweight lever secured to said hanger, a counterweight slidably mounted on said lever, and means engaging the vegetation to be cut for controlling the position of said counterweight.

5. A beet topping machine comprising a vehicle having a frame, a hanger pivotally mounted on said frame, knives secured to said hanger, a counterweight lever secured to said lever, a counterweight slidably mounted on said lever, a beet top engaging member disposed in front of said knives, means connecting said beet top engaging member and said counterweight for moving the same in a direction to increase its effective leverage, means for locking said counterweight in such position, and means for releasing said locking means to permit return of said counterweight.

6. A beet topping machine comprising a vehicle having a frame, a hanger pivotally mounted on said frame, knives secured to said hanger, a counterweight lever secured to said lever, a counterweight slidably mounted on said lever, a beet top engaging member disposed in front of said knives, means connecting said beet top engaging member and said counterweight for moving the same in a direction to increase its effective leverage, means for locking said counterweight in such position, and means engaging the ground for releasing said locking means upon lifting of said hanger to a predetermined height from the ground.

7. A beet topping machine comprising a vehicle having a frame, a hanger pivotally mounted on said frame, a counterweight lever secured to said hanger, a plurality of shiftable counterweights mounted on said lever, knives mounted upon said hanger, and means for independently shifting the position of said weights in accordance with the height of beets being cut.

8. A beet topping machine comprising a vehicle, a vertically movable hanger carried by the vehicle, knife means carried by the hanger and means for counterbalancing said hanger comprising a counterbalance lever, a counterbalance weight adjustably mounted on said lever, another counterbalance weight movably mounted on said lever, and means for automatically determining the position of said second counterweight in accordance with the size of the beet tops.

GENSUKE ISAGO.